United States Patent
Antonio et al.

(10) Patent No.: US 11,361,147 B2
(45) Date of Patent: Jun. 14, 2022

(54) METHOD AND SYSTEM FOR AUTOMATIC CUSTOMIZATION OF UNIFORM RESOURCE LOCATORS (URL) BY EXTRACTING A URL OR A CONTENT CONTAINING ONE OR MORE URLS AND REPLACING WITH ONE OR MORE CUSTOMIZED URLS

(71) Applicant: Radiate Capital Ltd, Dublin (IE)

(72) Inventors: Romano Antonio, Dublin (IE); Davide De Guz, Dublin (IE)

(73) Assignee: Davide De Guz, Dublin (IE)

( * ) Notice: Subject to any disclaimer, the term of this patent is extended or adjusted under 35 U.S.C. 154(b) by 0 days.

(21) Appl. No.: 17/361,184

(22) Filed: Jun. 28, 2021

(65) Prior Publication Data

US 2021/0406445 A1    Dec. 30, 2021

(30) Foreign Application Priority Data

Jun. 26, 2020    (EP) .................................... 20182740

(51) Int. Cl.
*G06F 40/134*     (2020.01)
*G06F 16/955*    (2019.01)

(52) U.S. Cl.
CPC ........ *G06F 40/134* (2020.01); *G06F 16/9554* (2019.01); *G06F 16/9558* (2019.01); *G06F 16/9566* (2019.01)

(58) Field of Classification Search
CPC . G06F 40/134; G06F 16/9558; G06F 16/9566
See application file for complete search history.

(56) References Cited

U.S. PATENT DOCUMENTS

| | | | | |
|---|---|---|---|---|
| 7,058,633 B1* | 6/2006 | Gnagy | ................ | G06F 16/9566 |
| 9,058,490 B1* | 6/2015 | Barker | ................ | G06F 16/9566 |
| 9,075,777 B1* | 7/2015 | Pope | ..................... | G06F 40/134 |
| 9,678,930 B1* | 6/2017 | Selvaraj | ................ | G06F 40/279 |
| 10,789,322 B2* | 9/2020 | Zhou | ................. | H04L 29/12594 |
| 2007/0124414 A1* | 5/2007 | Bedingfield | .......... | H04L 61/301 709/217 |
| 2009/0164502 A1* | 6/2009 | Dasgupta | ............ | G06F 16/9566 |

(Continued)

*Primary Examiner* — Asher D Kells
(74) *Attorney, Agent, or Firm* — ARC IP Law, PC; Joseph J. Mayo

(57) ABSTRACT

The invention provides a system and method for customizing one or more Uniform Resource Locator (URLs), including defining configuration rules which governs customization of one or more URLs; reading and loading the configuration rules to a computing device using a software means; activating an event listener means for identifying an event of a content copied to a temporary or other storage location of the computing device; extracting content for customization from the copied content; requesting a customization server to customize the extracted content based on the configuration rules; returning one or more customized URLs to the software means; and replacing the extracted content with one or more returned customized URLs. The invention enables users to obtain customized or branded URLs without interrupting the natural work process of copying and pasting and without any additional steps involved. The invention allows customization of URLs when a content is updated.

13 Claims, 4 Drawing Sheets

(56) References Cited

U.S. PATENT DOCUMENTS

| | | | |
|---|---|---|---|
| 2011/0153583 A1* | 6/2011 | Goldband | G06F 16/9566 707/706 |
| 2011/0225480 A1* | 9/2011 | Goldband | G06F 16/957 715/205 |
| 2011/0264992 A1* | 10/2011 | Vishria | G06F 16/9566 715/208 |
| 2013/0073745 A1* | 3/2013 | Bilinski | H04L 29/12594 709/246 |
| 2013/0104038 A1* | 4/2013 | Galper | G06F 16/9566 715/271 |
| 2014/0317517 A1* | 10/2014 | Aoki | H04L 67/42 715/738 |
| 2015/0156162 A1* | 6/2015 | Kaliski, Jr. | H04L 61/1505 709/203 |
| 2015/0264105 A1* | 9/2015 | V | H04L 67/02 709/201 |
| 2017/0339154 A1* | 11/2017 | Dey | H04L 12/1496 |
| 2020/0380059 A1* | 12/2020 | Ivanov | G06Q 30/0255 |
| 2021/0304121 A1* | 9/2021 | Lee | G06F 16/215 |

\* cited by examiner

METHOD AND SYSTEM FOR AUTOMATIC CUSTOMIZATION OF UNIFORM RESOURCE LOCATORS (URL) BY EXTRACTING A URL OR A CONTENT CONTAINING ONE OR MORE URLS AND REPLACING WITH ONE OR MORE CUSTOMIZED URLS

The application claims the benefit of European Patent Application No. 20182740.9, filed 26 Jun. 2020, the specification of which is hereby incorporated herein by reference.

BACKGROUND OF THE INVENTION

Field of the Invention

The present invention relates to a method and system for customizing Uniform Resource Locators (URLs).

Description of Related Art

In today's world, wherein approximately one billion names are looked for on various search engines almost on a daily basis, and 85% of customers conduct online research on the entities/individuals that they would want to engage with, increasing brand recognition and reinforcing brand awareness is a key consideration for organisations. Consequently, organisations have been widely using branded links for sharing content over the Internet.

A branded link is a shortened Uniform Resource Locator (URL) built around a brand name or a related term that helps to associate an organisation (or a product or a project) with the weblinks, content and information that is shared publicly. A product or a project with the weblinks, content and information that is shared. A branded link, aligns the content shared with the brand name of the organisation, and more importantly enhances brand awareness, the brand's image, credibility and trust in the organisation. Example of a branded link: https://CompanyName.com/Keyword.

Branding and customising a link (URL) means creating a new link that redirect to the original one but has where the elements of the URL are different such as Domain name, TLD and path. In this way the domain can include the brand of the company (or product) a meaningful TLD and meaningful keywords in the path. This is different from just shortening and URL that means make it shorter without the ability to change the specific parts of the link.

Link management services which enable organizations to rebrand and manage links are known in the art. Such services are usually cloud based and empower organisations to create branded links. However, link management services known in the art, allow users to rebrand links only manually, and further requires usage of a specific integration for each software that specifically replaces URLs for specific use cases.

Further, link management services known in the art require users to open an external application, paste the URL to be customised within the application, create the customised URL within the application, and copy and paste the customised URL to the final destination (for example, a browser). This process is time consuming and requires many steps from the user and disrupts their natural way of working. It can also be cause of errors.

US Patent Publication US2013/104038A1 discloses a URL shortening mechanism capable of automatically shortening one or more URLs without requiring a user to visit a specific website or copy and paste a URL to be customised into an external application. However, the invention disclosed in said prior art patent is focused towards URL shortening and only provides a means to merely shorten 'URLs' part of a content.

US Patent Publication US2011/225480 discloses a method and system that allows different content to be shown to different users or in a different context. This patent publication is focused on customising the content or copied content.

There is therefore an unresolved and unfulfilled need in the art for an automated and easily implementable means to customize URLs.

BRIEF SUMMARY OF THE INVENTION

According to the present invention there is provided, as set out in the appended claims, a system and method for customizing URLs.

In one embodiment the method includes the steps of defining a plurality of configuration rules to govern customisation of URLs and reading and loading the defined configuration rules to a computing device. An event listener means, which identifies an event of content uploaded or copied to a storage location, for example a temporary storage location of the computing device is then activated. Content for customization is extracted from the copied content based on protocol defined in the configuration rules using a control and customisation layer. Further, a customization server is requested to customize the extracted content based on the configuration rules. The customization server then returns one or more customized URLs to the computing device and the extracted content is replaced with the returned customized URLs.

It will be appreciated that the listener can work with the copy command and look in the temporary storage as well as listen in other kind of storages for modifications. For example an article published in a blog where once the content is changed then the process is initiated. The system and method of the invention can be initiated when a user copies a content (the temporary storage modified) or when a content is changed in a storage (for example a webpage) managed by a CMS (for example Wordpress).

As per another preferred embodiment of the present invention, a system for customizing URLs is provided. The system comprises a storage means, a computing device, an event listener means, a software means and a customization server. The storage means is adapted to store a plurality of pre-defined configuration rules which governs customization of URLs. The storage means is operatively coupled to the computing device.

The computing device further has a software means operatively coupled to it. The computing device has embedded in it an event listener means which is configured to identify an event of content copied to a temporary storage location of the computing device. The software means is configured to read and load the configuration rules to the computing device, initiate the event listener means, analyse content copied to the temporary storage location, extract content for customization from the copied content based on the configuration rules and to further request the customization server to customize the extracted content using a control and customisation layer. The customization server is configured to customize the extract content based on the configuration rules and to return one or more customized URLs to the computing device. The software means then replaces the extracted content in the temporary storage with the one or more customized URLs returned by the customization server. It will be appreciated that the software means can be a software stand alone module, a functionality built-in a software, a functionality embedded in an operating system, a plug-in module or the like.

As per another preferred embodiment of the present invention, a method and system for customizing URLs based on a plurality of pre-defined configuration rules is provided. The plurality of pre-defined configuration rules includes rules governing selection of one or more domain names for customization of URLs, rules governing selection of one or more URL paths for customization of URLs, rules governing adding and removing domain names from a predetermined whitelist or predetermined blacklist of domain names for customization of URLs, rules governing selection of URLs for customization, rules governing whether the copied content should be entirely replaced with the customized URLs or whether only URLs contained in the copied content should be replaced with customized URLs, rules governing destination of customized URLs, rules governing user permissions for URL customization and rules governing automation of URL customization.

As per another preferred embodiment of the present invention, a system and method for customizing URLs is provided. As per said embodiment, the entire content copied to a temporary memory location of the computing means is extracted and replaced with customized URLs. The content copied is a mix of plain text and one or more URLs.

As per another preferred embodiment of the present invention, a system and method for customizing URLs is provided. As per said embodiment, only URLs included in content copied to a temporary memory location of the computing means is extracted and replaced with customized URLs. The content copied is a mix of text and/or code and one or more URLs. In one embodiment a control and customisation layer is configured to locate and identify the one or more URLs in said copied content.

The present invention therefore enables users to obtain customized or branded URLs without interrupting the natural work process of copying and pasting and without any additional steps involved. The invention also allows for the customization of URLs when a content is updated, for example a blogpost or a webpage or the like. All typical steps disclosed in the art which users would usually be required to complete to obtain an optimised, branded, or shortened URL have been eliminated by the present invention.

Based on the pre-defined configuration rules, the present invention allows automatic and efficient rebranding of all URLs copied to a temporary storage location of a computing device. Branded links enhances brand awareness and brand recognition. Such links are also more trusted by readers since the link is branded to give the reader an understanding of where the link will lead them, therefore increasing trust attributed to a link. Branded links comprising the brand name of an organisation is also easier to remember than a generic URL.

It will be appreciated that in the context of the present invention the URL can be customised also if it is part of: a text linked; or a QRCode; or an embedded in an RFCode or similar.

The present invention hence provides a robust and user-friendly solution to problems identified in the art.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The present invention relates to a method and system for customizing Uniform Resource Locators (URLs), and more particularly to a method and system for automatic customization of URLs based on a pre-defined set of configuration rules.

Figure 1:
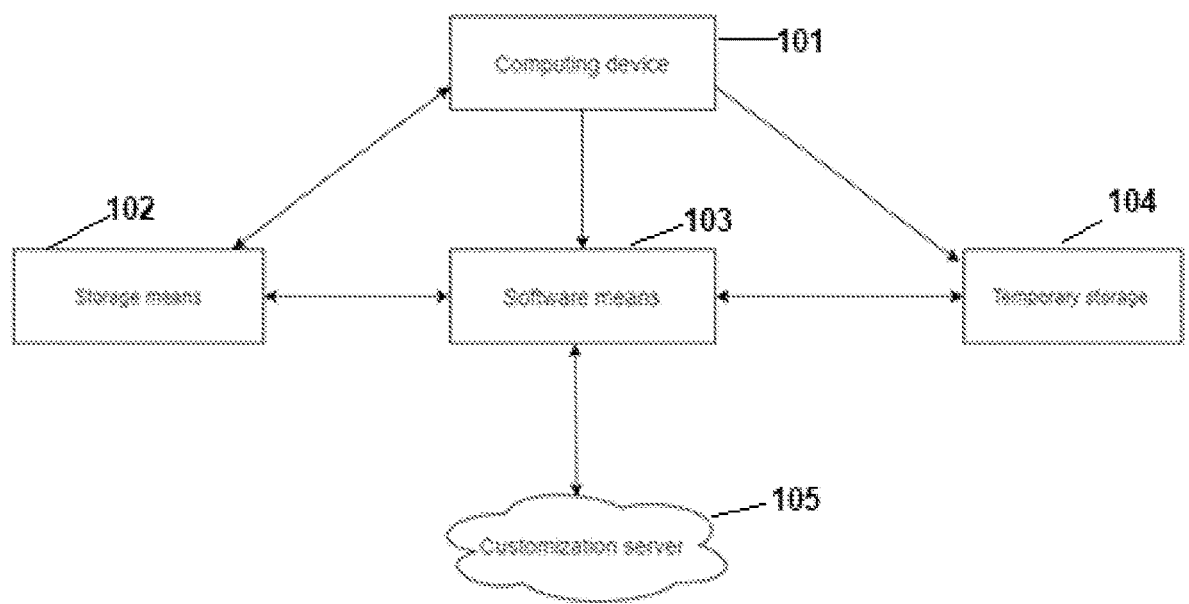
FIG. 1 is a schematic diagram illustrating a preferred embodiment of the present invention.

FIG. 1 is a schematic diagram illustrating the environment used for enabling various preferred embodiments of the present invention. The computing device 101 may be a personal computer, a portable device such as a tablet computer, a laptop, a smart phone, connected household device or any operating system based portable device. The operating system deployed on the computing device may be Windows, OSX, Linux, iOS, Android, and the like. It can also be another server that change a content. The temporary storage 104 location may be a short-term data storage location of the computing device 101 such as a clipboard, a pasteboard, a cache memory, which allows transfer of content using copy and paste commands. The software means 103 may be an application installed on the operating system of the computing means 101, a plugin inside a third-party software, a software running autonomously on a hardware platform or a proxy installed on a server of part of a software or an API. The storage means 102 may be any internal or external device or web-based data storage mechanism adapted to store data. The storage means 102 stores a plurality of predefined configuration rules.

As shown in FIG. 1, a user of the computing device 101 has access to the storage means 102 to create, read, update or delete the configuration rules. A user of the computing device has access to the software means 103 for installing, uninstalling, executing, and interacting with the software means 103. The software means 103 reads and loads the plurality of predefined configuration rules to the computing device 101 and has access to the temporary storage 104 location for analyzing and extracting content updated or copied to the temporary storage 104. Further, the software means 103 requests a customization server to customize content copied to the temporary storage 104 location based on the configuration rules. Communication between the computing device 101 and the software means 103, the computing device 101 and the storage means 102, the software means 103 and the storage means 102, and the software means 103 and the customization server 105, may be enabled using a communication network. The storage means as well the customisation server can be both online on the internet—on local machine or on an internal network. The communication network may be a local area network, a wide area network, or combinations thereof, for example the internet.

Figure 2:
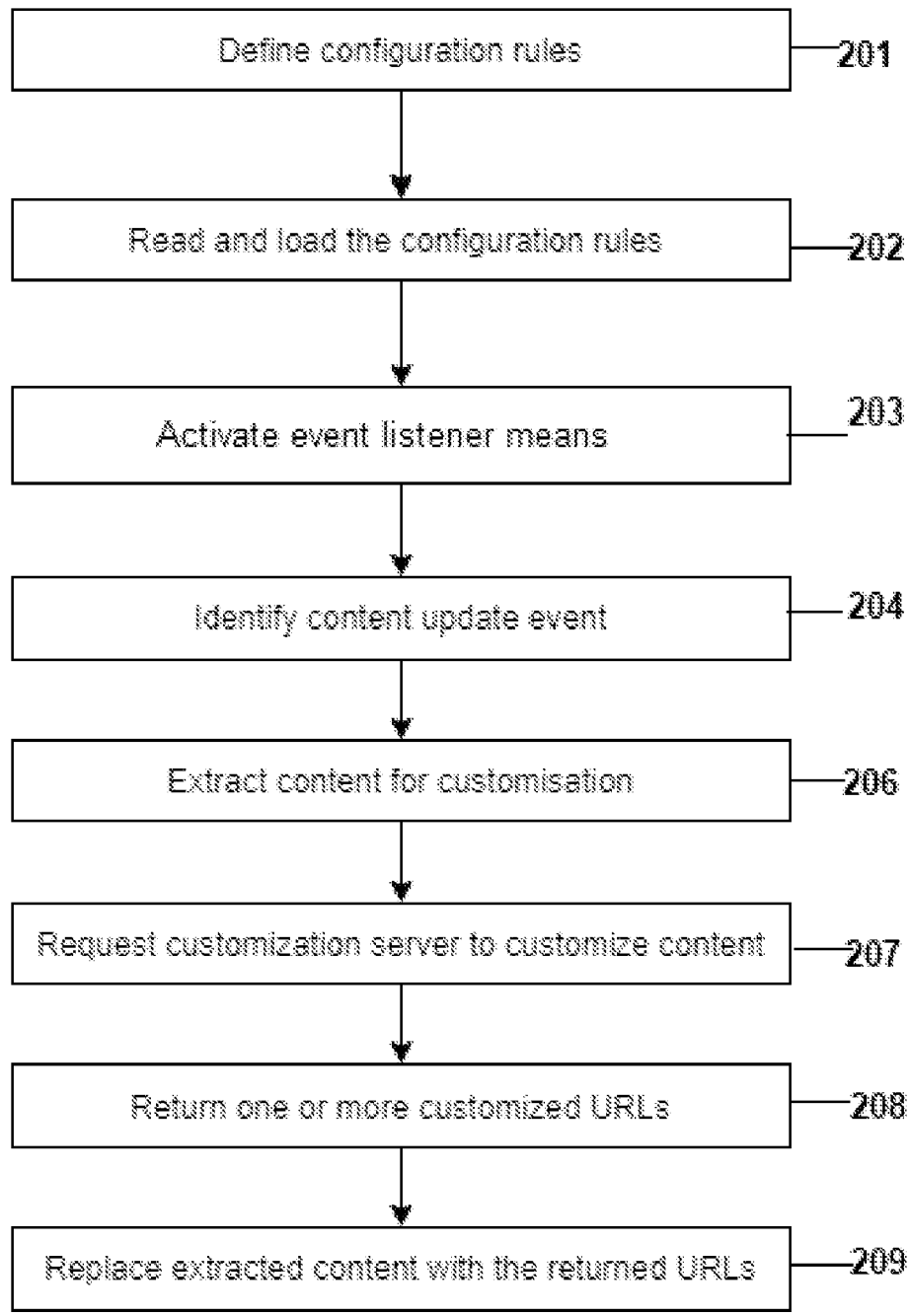
FIG. 2 is a flow diagram illustrating a method as per a preferred embodiment of the present invention.

FIG. 2 is a flow diagram illustrating a method as per a preferred embodiment of the present invention. The method includes the steps of firstly defining a plurality of configuration rules which governs customization of one or more URLs 201. The defined rules are further read by the software means and loaded to the computing device 202. Further, an event listener means is activated for identifying an event of a content updated or copied by a user of the computing device to a temporary storage location of the computing device 203. If an event is identified by the event listener means, it is delivered to the software means 204.

The software means analyses the copied content in the temporary location and extracts content for customization based on the protocol defined in the configuration rules 206. As per a preferred embodiment, the content copied to the temporary location is a mix of plain text and URLs. The software means further requests a customization server to customize the extracted content 207. The customization server generates one or more customized URLs from the extracted content based on the defined configuration rules. The software means can be embodied as a control and customisation layer. The control and customisation layer can be programmed based on the customer or enterprise requirements and implement the various rules or options defined in FIG. 4. For example the control and customisation layer is configured to locate and identify the one or more URLs in a copied content. This is very advantageous as errors in locating and identifying a URL are removed, especially in the scenario where the copied content have a number of URL addresses. The control and customisation layer can be configured depending on the application required. The domain name and TLD for a resulting customised link can be configured. In another embodiment the text after slash can be displayed based on the customisation. For example this can be done with a keyword, with a prefix, and with a parameter selected to be as short as possible The one or more customized URLs are returned to the software means 208 which replaces the extracted content in the temporary storage location with the returned one or more customized URLs 209.

Figure 3:
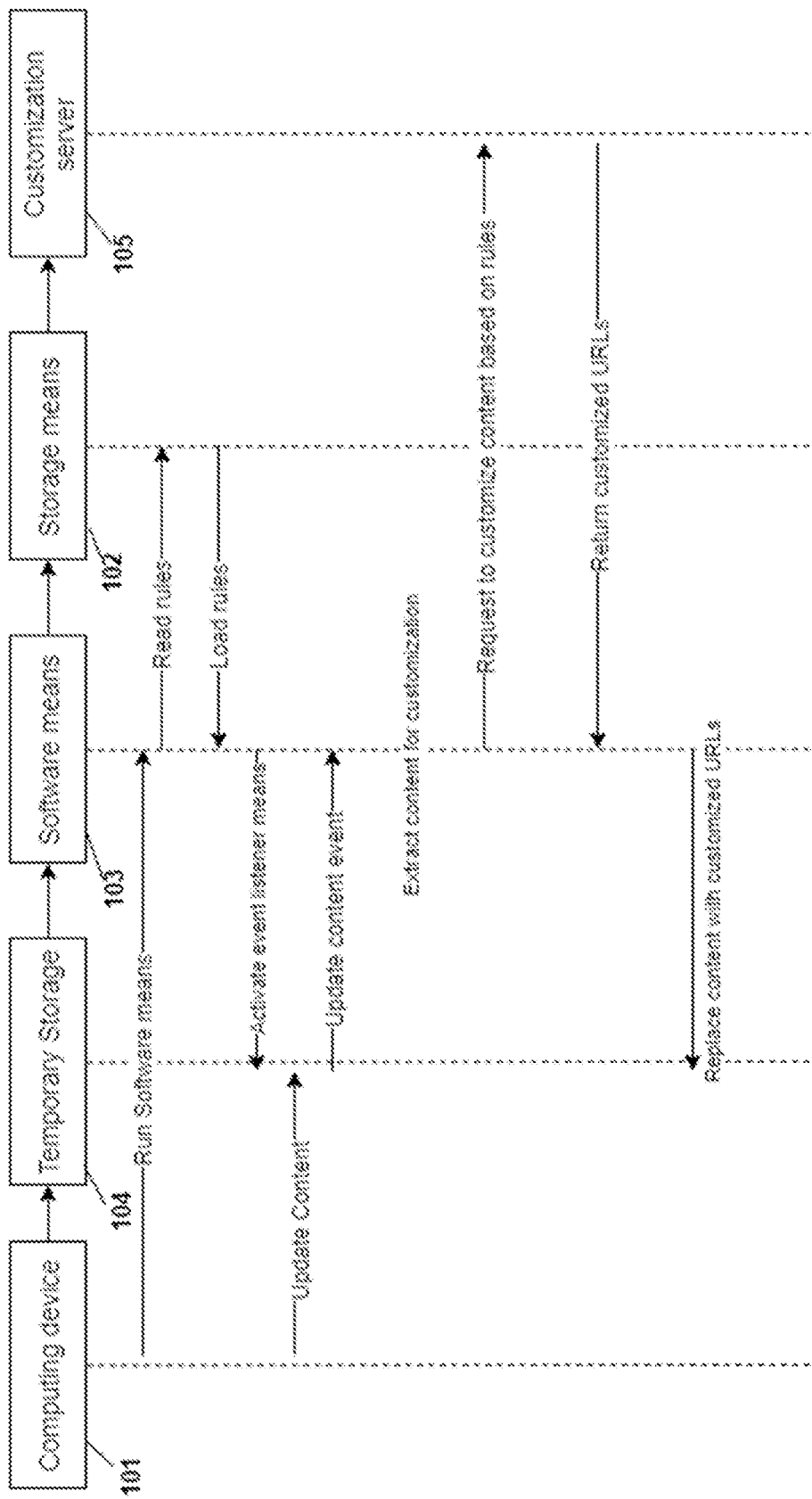
FIG. 3 illustrates a system as per a preferred embodiment of the present invention.

FIG. 3 illustrates a system for customizing URLs as per a preferred embodiment of the present invention. The system as per the present invention comprises a computing device 101, a storage means 102, a software means 103, a temporary storage 104 location of the computing device 101, and a customization server 105. The storage means 102 is adapted to store a plurality of pre-defined configuration rules which govern customization of the URLs. The computing device 101 is operatively coupled to the storage means 102 and a software means 103. In a preferred embodiment, the software means 103 is embedded in the computing device 101. The computing device 101 further has an event listener means embedded in it. The event listener means is configured to identify an event of a content updated or copied to the temporary storage 104 location of the computing device 101. The temporary storage 104 location may be a clipboard, a pasteboard, a cache memory or the like, which allows transfer of content using copy and paste commands.

The software means 103 is configured to read the configuration rules from the storage means 102 and to further load the configuration rules to the computing device 101. The software means 103 activates the event listener means and analyses content copied or updated to the temporary location 104 once an event is generated. The software means 103 is further configured to extract content for customization from the copied content based on the configuration rules and to request the customization server 105 to customize the extracted content. The customization server 105 is configured to generate customized URLs from the extracted content based on a protocol defined in the configuration rules. The protocol is configured as a control and customisation layer. The control and customisation layer can be programmed based on the customer or enterprise requirements and implement the various rules or options defined in FIG. 4. For example the control and customisation layer is configured to locate and identify the one or more URLs in a copied content. This is very advantageous as errors in locating and identifying a URL are removed, especially in the scenario where the copied content have a number of URL addresses. The customization server 105 further returns one or more customized URLs to the software means 103 which in turn replaces the extracted content with the returned one or more URLs in the temporary storage 104 location.

Figure 4:
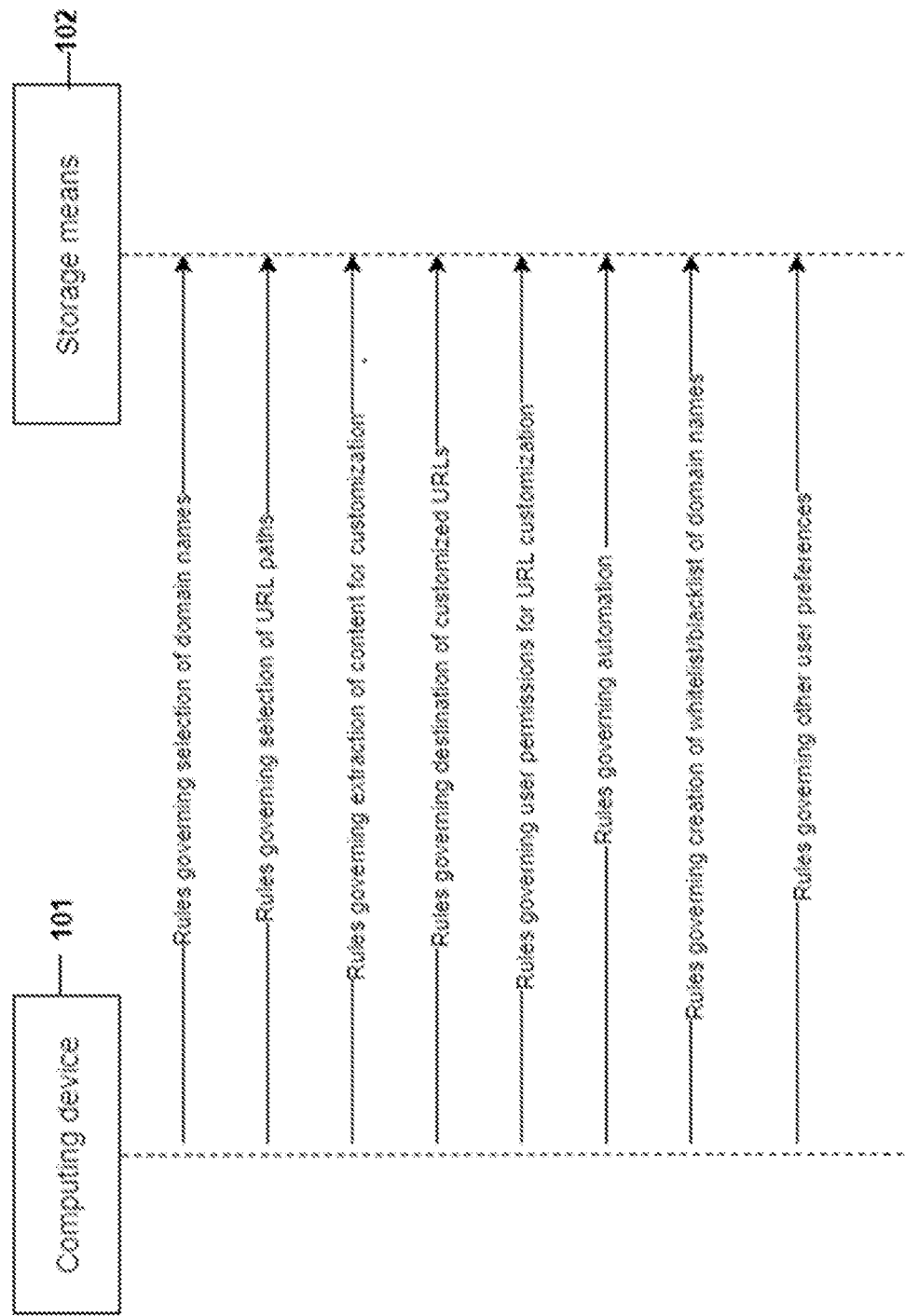
FIG. 4 illustrates the step of defining configuration rules as per a preferred embodiment of the present invention.

FIG. 4 illustrates the step of defining configuration rules as per a preferred embodiment of the present invention. The plurality of configuration rules may be defined, for example, by a user having privileged access rights in the computing device 101 and the defined configuration rules are stored in the storage means 102. In a preferred embodiment, the storage means 102 is external to the software means 103 to ensure access to the configuration rules to multiple stakeholders. The configuration rules are defined based on the user preferences. The configuration rules may include rules governing selection of one or more user preferred domain names for customization of URLs and adding or removing domain names from a predetermined whitelist or a predetermined blacklist. In a preferred embodiment, a content is extracted for customization only if it contains a domain name which is listed in the whitelist. In another preferred embodiment, a content containing a domain name listed in the blacklist is not extracted for customization.

The configuration rules may include rules governing selection of one or more URL paths for customization of URLs. The scope of such rules may include selection of a random path, selection of a shortest path, selection of a path determined by a user, selection of a specific hierarchical path with a specific suffix or a specific prefix, or combinations thereof. The configuration rules may include rules governing extraction of content for customization. The scope of such rules may define whether the entire content (including plain text (and or code, or formatted text) and URLs) copied to a temporary storage location should be extracted for customization, or whether only URLs included in the copied content should be extracted for customization.

The configuration rules may include rules governing selection of URLs for customization. For example, the user may define rules which may mandate that URLs with certain specific domain names shall not be customized. The configuration rules may further include rules governing user permissions for URL customization, degree of automation of URL customization, and destination URLs. The scope of rules governing user permissions may define under what circumstances the consent of the user needs to be obtained when a URL is customized or whether the permission of the user shall be take prior to initializing URL customization. The scope of rules governing destination URLs may include rules defining adding or removing query parameters.

The method and system as per the present invention therefore automatically replaces and customizes content updated in a temporary storage location of a computing device without changing the usual workflow of the user. The content is customized or rebranded based on rules defined by a user of the computing device. The present invention can be used to generate multiple customized URLs at the same time. The present invention hence provides means to generate new, shortened, and optimized URLs containing a domain name of the user's choice.

Although the present invention has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present invention as defined.

Further, a person ordinarily skilled in the art will appreciate that the various illustrative logical/functional blocks and process steps described in connection with the embodiments disclosed herein may be implemented as electronic hardware, or a combination of hardware and software. To clearly illustrate this interchangeability of hardware and a combination of hardware and software, various illustrations and steps have been described above, generally in terms of their functionality. Whether such functionality is implemented as hardware or a combination of hardware and software depends upon the design choice of a person ordinarily skilled in the art. Such skilled artisans may implement the described functionality in varying ways for each particular application, but such obvious design choices should not be interpreted as causing a departure from the scope of the present invention.

The process described in the present disclosure may be implemented using various means. For example, the apparatus described in the present disclosure may be implemented in hardware, firmware, software, or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software codes may be stored in a memory and executed by a processor. Memory may be implemented within the processor unit or external to the processor unit. As used herein the term "memory" refers to any type of volatile memory or non-volatile memory.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A method of customizing one or more Uniform Resource Locator (URLs), the method comprising:

defining a plurality of configuration rules which governs customization of one or more URLs;

reading and loading the plurality of configuration rules to a computing device using a software;

activating an event listener for identifying an event of a content copied or uploaded to a temporary or other storage location of the computing device;

extracting content for customization from the content copied, wherein the content that is extracted is selected based on protocol defined in the plurality of configuration rules using a control and customization layer;

requesting a customization server to customize the content that is extracted based on the plurality of configuration rules;

returning one or more customized URLs to the software; and replacing the content that is extracted with one or more returned customized URLs;

wherein the plurality of configuration rules comprises rules governing selection of one or more domain names for customization of URLs, rules governing selection of one or more URL paths for customization of the URLs, rules governing adding and removing domain names from a predetermined whitelist or predetermined blacklist of domain names for customization of the URLs, rules governing selection of the URLs for customization, rules governing whether the content copied should be entirely replaced with the one or more customized URLs or whether only URLs contained in the content copied should be replaced with the one or more customized URLs, rules governing destination of the one or more customized URLs, rules governing user permissions for URL customization, and rules governing degree of automation of URL customization.

2. The method as claimed in claim 1, wherein the rules governing selection of the one or more URL paths includes selection of a random path, selection of a shortest path, selection of a path determined by a user, and selection of a specific hierarchical path with a specific suffix or a specific prefix.

3. The method as claimed in claim 1, wherein only the content copied comprising a domain name listed in the predetermined whitelist is extracted for customization.

4. The method as claimed in claim 1, wherein the content copied comprising a domain name listed in the predetermined blacklist is not extracted for customization.

5. The method as claimed in claim 1, wherein the content copied comprises of plain text and the one or more URLs and wherein the control and customization layer is configured to locate and identify the one or more URLs in said content copied.

6. The method as claimed in claim 1, wherein the content copied consists of the one or more URLs.

7. A system for customizing one or more Uniform Resource Locator (URLs), the system comprising:

a storage configured to store a plurality of pre-defined configuration rules, wherein the plurality of pre-defined configuration rules govern customization of one or more URLs;

a computing device operatively coupled to the storage and to a software, the computing device comprising an event listener embedded therein, the event listener configured to identify an event of a content copied to a temporary storage location of the computing device, wherein the software is configured to:

read and to load the plurality of pre-defined configuration rules to the computing device, activate the event listener, analyze the content copied to the temporary storage location or to another storage location, extract content for customization from the content copied based on the plurality of pre-defined configuration rules using a control and customization layer, request a customization server to customize the content that is extracted and replace the content that is extracted with one or more customized URLs, wherein the customization server is configured to customize the content that is extracted based on the plurality of pre-defined configuration rules and to return one or more customized URLs to the computing device;

wherein the plurality of pre-defined configuration rules comprises rules governing selection of one or more domain names for customization of URLs, rules governing selection of one or more URL paths for customization of the URLs, rules governing adding and removing domain names from a predetermined whitelist of domain names or predetermined blacklist of domain names for customization of the URLs, rules governing selection of the URLs for customization, rules governing whether the content copied should be entirely replaced with the one or more customized URLs or whether only URLs contained in the content copied should be replaced with the one or more customized URLs, rules governing destination of the one or more customized URLs, rules governing user permissions for URL customization, and rules governing degree of automation of URL customization.

8. The system as claimed in claim 7, wherein the rules governing selection of the one or more URL paths includes selection of a random path, selection of a shortest path, selection of a path determined by a user, and selection of a specific hierarchical path with a specific suffix or a specific prefix.

9. The system as claimed in claim 7, wherein only the content copied comprising a domain name listed in the predetermined whitelist is extracted for customization.

10. The system as claimed in claim 7, wherein the content copied comprising a domain name listed in the predetermined blacklist is not extracted for customization.

11. The system as claimed in claim 7, wherein the content copied comprises of plain text and the one or more URLs and wherein the control and customization layer is configured to locate and identify the one or more URLs in said content copied.

12. The system as claimed in claim 7, wherein the content copied consists of the one or more URLs.

13. The system as claimed in claim 7, wherein the software is embedded in the computing device.

* * * * *